Aug. 10, 1965  J. F. MORSE  3,199,315
RESILIENT TORSIONAL COUPLING
Filed Aug. 20, 1963  2 Sheets-Sheet 2

INVENTOR.
JOHN F. MORSE
BY Hamilton & Cook
ATTORNEYS

United States Patent Office 3,199,315
Patented Aug. 10, 1965

3,199,315
RESILIENT TORSIONAL COUPLING
John F. Morse, 21 Clinton St., Hudson, Ohio
Filed Aug. 20, 1963, Ser. No. 303,292
4 Claims. (Cl. 64—27)

The present invention relates generally to resilient couplings. More particularly, the present invention relates to a resilient torsional coupling for joining aligned shafts so as to reduce the impact of torsional shock loading therebetween. Specifically, the present invention relates to couplings particularly adapted for marine installation.

In marine propulsion units, particularly those classified as outboard or outdrive units, the use of a dog type clutch is considered highly desirable because of its small size, low weight and low cost.

The use of such a dog type clutch, however, has been limited by the weight of the driven components of the propulsion units—e.g., the propeller, propeller shaft and necessary gearing. When the combined weight of these components reaches a certain amount, movement of the dog clutch into and out of engagement subjects its teeth to an excessive and deleterious shock load due to the high inertia of the components. The obviate this shock loading, it has heretofore been thought necessary to utilize the larger, heavier and more expensive disc type clutch in conjunction with marine propulsion units rated above 100 horsepower.

In an attempt to relieve the shock loading associated with the higher horsepower propulsion installations, certain resilient coupling arrangements have been tried, but to date they have all proven unsatisfactory.

One of such prior art resilient coupling constructions utilized a hub on the opposed ends of the aligned driving and driven shaft. These hubs were notched, or serrated, on the radially outer surface and interconnected solely by a fitted shroud of resilient material such as rubber.

The construction of another known resilient coupling concept has taken several variations. In this second type construction each opposed end of the aligned driving and driven shaft has also been supplied with a hub. In one variation a series of sockets, or bores, were provided and into each is fitted a resilient material forming a roller-like sleeve through which a connecting stud or pin is rigidly secured to the opposed hub. In another variation the second hub is also provided with a plurality of sockets which align with those of the first hub. These too were each filled with a resilient, roller-like sleeve, and a bolt extended through each aligned pair of opposed sockets medially of the roller-like resilient material.

Washers or other suitable means are provided on the bolt so that tightening a nut thereon will compress the aligned resilient material in the sockets of the opposed hubs.

In both variations a resilient gasket or thrust pad is often positioned between the opposed hubs, or at least between the opposed ends of the driving and driven shaft.

Although the second variation described above afforded a somewhat greater latitude of relative torsional movement between the coupling elements attached to the opposed shafts joined thereby, interference of the bolt with the sides of the socket and the close proximity of those portions of the opposed hubs through which the connecting bolts pass, nevertheless still imposed too great limitations on the relative torsional movement available to alleviate the shock loading.

Furthermore, the placement of the resilient material together with the configuration of the prior known coupling devices caused them to "snap back" to normal position as soon as the force causing the torsion of rotation between the coupling elements was released. The disadvantage in such a "snap back" action is immediately apparent when one considers that "snap back" is initiated by partial engagement of the dog teeth upon engaging or disengaging the dog clutch. This "snap back" action of the coupling causes an acceleration in the velocity of the teeth on the side of the clutch connected to the coupling when the teeth are only partly engaged so that the teeth tend to skip. Thus, the damage occasioned to the clutch teeth may be greater with such a coupling than without.

Therefore, it is an object of the present invention to provide a resilient torsional coupling with a dampened return rate, i.e., one which will not snap back.

It is another object of the present invention to provide a resilient torsional coupling capable of absorbing high torque loads.

It is still another object of the present invention to provide a resilient, torsional coupling having a much greater range of torsional movement between the coupling elements.

It is a further object of the present invention to provide a resilient, torsional coupling which, because of its increased torsional range and its ability to absorb high torque loads without snap back, will permit the use of a dog clutch on higher horsepower marine propulsion units than has heretofore been thought possible.

It is a still further object of the present invention to provide a resilient, torsional coupling, as above, which is compact, light in weight, simplified in construction and relatively inexpensive to manufacture and maintain.

These and other objects which will become apparent from the following specification are accomplished by means hereinafter described and claimed.

One preferred embodiment of the present invention is shown by way of example in the accompanying drawings and described in detail without attempting to show all of the various modifications in which the invention might be embodied; the invention being measured by the appended claims and not by the details of the specification.

Figure 1:
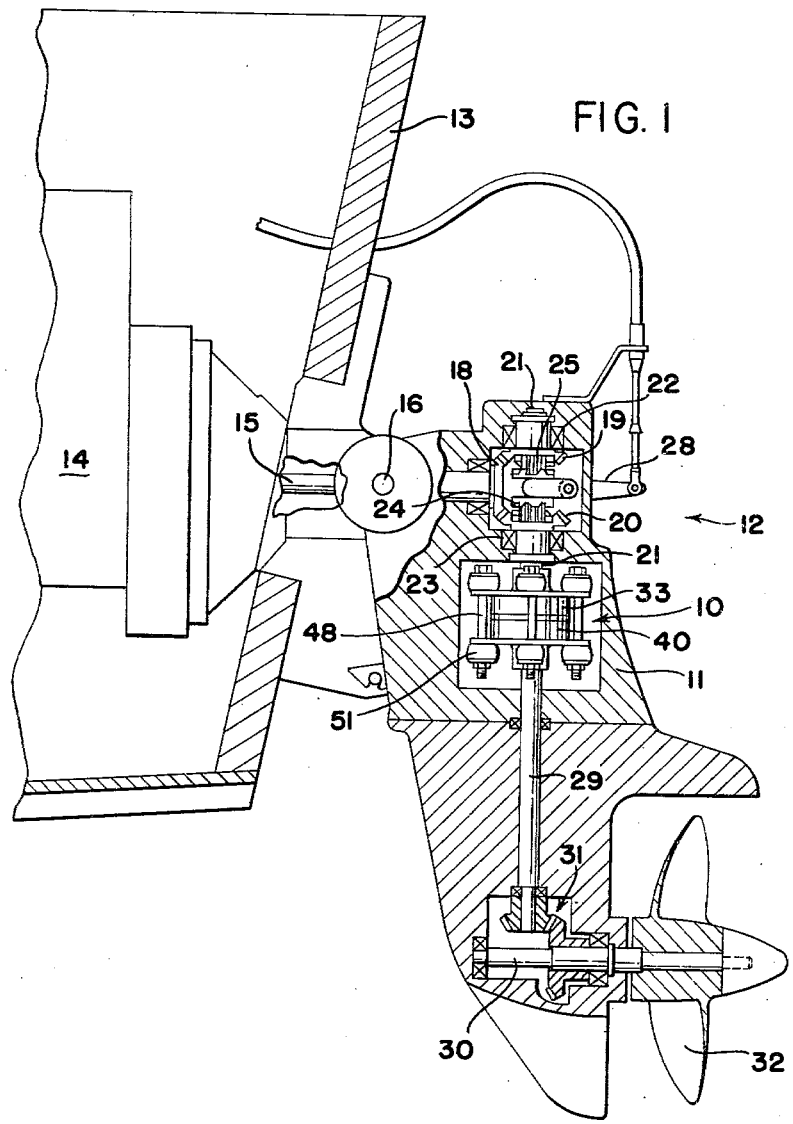
FIG. 1 is a fragmentary side elevation, partly cut away, of an inboard-outdrive marine propulsion unit using a dog clutch and a resilient torsional coupling according to the present invention.

In general, a resilient torsional coupling according to the present invention is utilized to join two axially aligned shafts. The hub is affixed to each shaft such that the opposed faces of the hubs are in close proximity with a clutch-like frictional pad therebetween. An annular flange extends radially outwardly of each hub in a plane spaced axially of the face thereof. The flanges are bored to receive a plurality of bolts loosely enough for the bolts to cant freely therein. A resilient cushion is interposed between the one flange and the head of the tie bolt and another cushion is interposed between the other flange and the nut thereon.

Referring particularly to the drawings, the improved resilient torsional coupling, indicated generally by the numeral 10, is enclosed in the housing 11 of an outdrive assembly 12 secured to a boat transom 13.

The inboard engine 14 transmits power through transom 13 into the outdrive assembly 12 via a drive shaft 15. As is conventional practice, the drive shaft 15 incorporates a universal joint, not shown, the center of rotation of which is located at the horizontal and vertical pivot point 16 of assembly 12. This permits unobstructed horizontal rotation for steering and an unobstructed rearwardly and upwardly swing when striking underwater obstructions. The drive shaft 15 is connected to a bevel gear 18 which meshes with axially aligned drive gears 19 and 20. Gears 19 and 20 are coaxially aligned with the outdriving shaft 21 about which they freely rotate in their support bearings 22 and 23, respectively. A dog clutch 24 is splined on the outdrive driving shaft 21 between gears 19 and 20.

The splined portion 25 of driving shaft 21 provides for free displacement of the dog clutch 24 axially of shaft 21 to permit the teeth of dog clutch 24 to be moved selectively into engagement with one or the other of the drive gears 19 and 20 by a shifting mechanism 28. The outdrive driving shaft 21 is connected to the driven shaft 29 via coupling 10. The driven shaft 29 in turn is connected to rotate propeller shaft 30 by the bevel gear arrangement 31.

The system described above transmits the driving power from the inboard engine 14 to the propeller 32.

Figure 2:
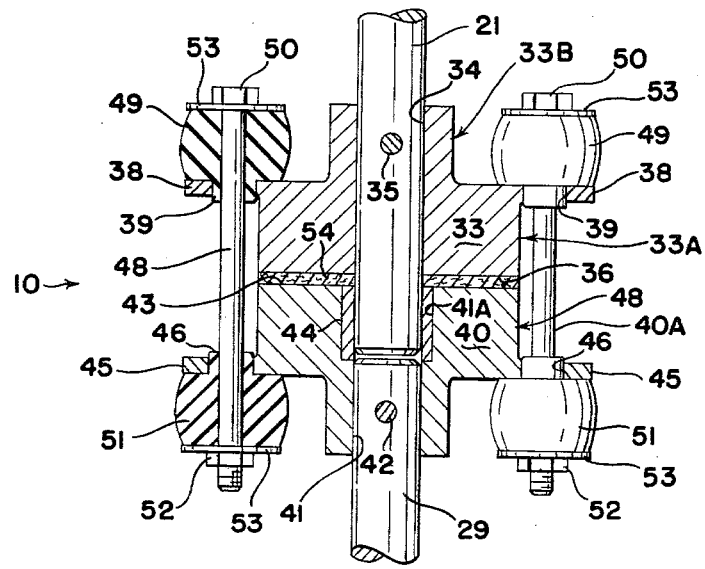
FIG. 2 is an enlarged cross-sectional view through the improved resilient torsional coupling shown in FIG. 1; and, FIG. 3 is a side elevation of the torsional coupling shown in FIG. 2 depicting the torsional displacement of the coupling under impact loads.

Referring more particularly to FIG. 2, the hub 33 is bored, as at 34, a fit over the end of the driving shaft 21. Hub 33 is nonrotatably secured to shaft 21, as by a pin 35, so that a short section of shaft 21 extends beyond the face 36 of the hub 33. For reasons more fully hereinafter described the portion 33A of hub 33 presenting face 36 may be of a larger diameter than the remainder of the hub 33B.

Extending radially outwardly of the enlarged portion of hub 33 is an annular flange 38, or, if desired, a series of radially extending ears. The flange 38 is spaced axially of the face 36 and is provided with a series of axially disposed bores 39. As shown in the preferred embodiment, the flange 38 is spaced axially of face 36 approximately the distance equivalent to the diameter of the shaft 21 on which the hub 33 is mounted, and there are four bores 39 circumferentially spaced about the flange.

A similar hub 40 is bored, as at 41, to fit over the end of the outdrive driven shaft 29. Hub 40 is also nonrotatably secured to shaft 29, as by a pin 42. However, the shaft 29 does not extend beyond the face 43 of the hub 40 but is instead spaced inwardly thereof. Preferably, that portion 41A of the bore 41 between the end of the shaft 29 and the face 43 of hub 40 is of larger diameter than the remainder of the bore to receive a bearing insert 44 in which the end of the shaft 21 can turn when the coupling is assembled. It should be noted that there is a clearance between the opposed ends of shafts 21 and 29 for a purpose hereinafter more fully explained. By thus extending the shaft 21 through hub 33 and into hub 40, the alignment of the shafts 21 and 29 can be maintained without the need for additional bearings on either side of the coupling 10.

That portion 40A of the hub 40 presenting face 43 may also be of an enlarged diameter and have an annular flange 45, or its equivalent, extending radially outwardly thereof. This flange 45 is also spaced axially of the face 43 and preferably a distance equal to approximately the diameter of the shafts joined by the coupling. Similarly too, the flange 45 is provided with an identical number of axially oriented bores 46, as is flange 38, which are spaced circumferentially around flange 45 so as to be registerable with the bores 39 in flange 38 when the coupling is connected between the shafts 21 and 29.

A tie bolt 48 extends between each of the registered bores 39 and 46 to connect the hub 33 to hub 40.

Each tie bolt 48 also extends through a doughnut-like cushion 49 positioned between the head 50 of bolt 48 and the flange 38 and a similar doughnut-like cushion 51 positioned between flange 45 and the nut 52 which is provided for adjustably tightening tie bolt 48. As can be seen these cushions 49 and 51 are positioned in registry with the bores 39 and 46 in flanges 38 and 45 on the opposite side of the flanges from the faces 36 and 43 on the respective hubs 33 and 40. Each cushion 49 and 51 also has an anchoring neck portion 49A and 51A, respectively, which extend into the bore with which the cushion is registered.

The cushions 49 and 51 are preferably constructed of a resilient material, such as rubber, so that a washer or other engaging means, 53 is desirably positioned between the head 50 and cushion 49 as well as between the nut 52 and the cushion 51.

As hereinbefore stated, when the hubs 33 and 40 are mounted on the respective shafts 21 and 29 the faces 36 and 43 of the hubs are in close proximity, and a clutch-like frictional pad, or disk, 54, is engageably positioned therebetween. The diameter of portions 33A and 40A is relatively large to provide a greater surface area to contact friction pad 54. For best results it has been found that the tie bolts 48 should be tightened by nut 52 to apply a light pressure against cushions 49 and 51, and the hubs 33 and 40 should similarly engage the frictional pad 54 when the coupling 10 is in the no load condition shown in FIGS. 1 and 2.

Although in the preferred embodiment the flanges 38 and 45 are spaced back from the faces 36 and 43 of their respective hubs 33 and 40 a distance equivalent to the diameter of the shafts joined thereby, it must be realized that a variation in the amount of torsional movement available between the hubs 33 and 40 can be controlled by varying this spacing as well as the tightness of the tie bolts 48.

To visualize the improved coupling 10 in actual operation, let us assume that the propeller 32 is stationary and the dog clutch is in neutral position. Under this condition the dog clutch is moved to either the forward or reverse position with the engine running at the proper speed for shifting gears. Upon initial contact between the rotating gear 19 or 20 and the dog clutch 24 the dog clutch will tend to follow the gear as the teeth begin to intermesh, unless some resistance opposes the movement of the dog clutch 24.

In the environment shown in FIG. 1 the resistance is provided by the inert mass of the propeller 32, gearing 31 and driven shaft 29, which in the higher horsepower installations is considerable. Without the improved coupling the teeth of the dog clutch 24 would skip across the teeth of the gear 19 or 20 being engaged and cause considerable damage.

However, with the coupling 10 interposed between the driving shaft 21 and the driven shaft 29, the mass opposing the free movement of the dog clutch 24 is only that of the short driving shaft 21 and the upper half of the coupling hub 33.

The range of rotational movement available between the hubs 33 and 40, because of the particular configuration and construction of the coupling, affords a time delay sufficient to permit complete, or almost complete, engagement of the teeth in the dog clutch 24 with either the gear 19 or 20 before the loading of the inert mass of the propulsion system beyond the coupling is transmitted to the clutch mechanism.

Figure 3:
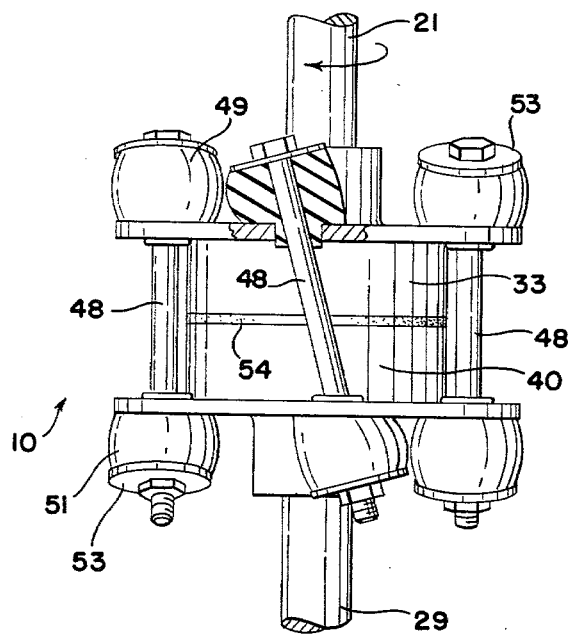

Moreover, the high torque stress incident to the impact load resulting from initiating rotational movement of the inert mass of the propeller, gearing and driven shaft, is cumulatively imparted to the clutch mechanism because of the coupling 10. If the hubs 33 and 40 rotate relative to each other, i.e., a rotational rate differential exists therebetween the tie bolts 48 cant (see FIG. 3) to permit the necessary range to the rotational movements, but at the same time they apply a gradually increasing pressures against the cushions 49 and 51. The axial component of this pressure acts to move the hubs 33 and 40 toward each other so as to engage the friction pads 54 more firmly therebetween, with the extension of shaft 21 in bearing 44 always maintaining shafts 21 and 29 in alignment. Accordingly, there is an increasing frictional engagement between the hubs 33 and 40 in response to the relative rotation therebetween. This causes the impact load to be gradually absorbed through the coupling and eliminates the snap back incident to the prior known couplings.

The increase in the friction necessary to accomplish the above described torque absorption is effected by the axial movement of the hubs 33 and 40 toward each other. Movement sufficient to provide this result is generally available by the normal axial movement available from shafts 21 and 29 in their bearings without requiring a particular joinder between the hubs and their respective shafts. However, if additional axial displacement of the hubs is required, either, or both, of the hubs may be mounted on their respective shafts in such a way as to permit the desired movement.

From the foregoing specification it is readily apparent that a coupling constructed in accordance with the concept of the present invention accomplishes the objects of the invention.

What is claimed is:

1. A resilient torsional coupling for joining the end of a driving shaft to the end of an axially aligned driven shaft comprising, a first hub, a bore axially through said first hub, the end of said driving shaft nonrotatably received in the bore of said first hub, a second hub, a bore axially through said second hub, the end of said driven shaft nonrotatably received in the bore of said second hub, the end of one of said shafts extending through the bore of the hub nonrotatably mounted thereon and rotatably received in the bore of the other said hub, said hubs movable toward and away from each other, a friction face on the axially opposed surfaces of said hubs, said friction faces being spaced apart with a friction pad engaged between said opposed, spaced apart faces, a radially extending peripheral flange on each said hub spaced axially of the face thereon a distance equivalent to approximately the diameter of the shafts joined by said coupling, a plurality of circumferentially spaced bores in the flange on each said hub, the bores in the flange on said first hub registerable with the bores in the flange on said second hub, bolt means extending between the bores in the flanges on said first and second hubs, resilient means interconnecting said bolt means to said flanges to permit said bolt means to cant and draw said opposed faces against said friction pad when a rotational rate of differential exists between said first and second hubs.

2. A resilient torsional coupling for joining the end of a driving shaft to the end of an axially aligned driven shaft comprising, a first hub, a bore axially through said first hub, the end of said driving shaft nonrotatably received in the bore of said first hub, a second hub, a bore axially through said second hub, the end of said driven shaft nonrotatably received in the bore of said second hub, the end of one of said shafts extending through the bore of the hub nonrotatably mounted thereon and rotatably received in the bore of the other said hub, said hubs movable toward and away from each other, a friction face on the axially opposed surfaces of said hubs, said friction faces being spaced apart with a friction pad engaged between said opposed, spaced apart faces, a radially extending peripheral flange on each said hub spaced axially of the face thereon a distance equivalent to approximately the diameter of the shafts joined by said coupling, a plurality of circumferentially spaced bores in the flange on each said hub, the bores in the flange on said first hub registerable with the bores in the flange on said second hub, a doughnut-like cushion means with a bore therethrough positioned in registry with each bore of both flanges on the opposite side of the flange from the face of the hub, a bolt extending through each pair of registerable bores in the two flanges of said hubs and their registered cushion means, said bolts adapted to cant when a rotational rate of differential exists between said first and second hubs, and means on each bolt to engage said cushion means when said bolts are canted.

3. A resilient torsional coupling joining two axially aligned shafts for transmitting driving force therebetween comprising, a driving shaft having a hub secured thereon, an aligned driven shaft axially spaced from said driving shaft and having a hub secured thereon, the end of one of said shafts extending into and journaled in the hub of said other shaft, said hubs having opposed faces, a friction disk engaged between said opposed faces, radially extending flanges on said hubs in axially spaced relation to each other, at least one of said flanges spaced axially from its hub face, clamping bolts extending through said spaced flanges, and resilient cushions interposed between the ends of said bolts and said flanges to permit canting of said bolts in response to torsional movement between said hubs, resulting in axial movement of said opposed hub faces toward each other.

4. A resilient torsional coupling joining two axially aligned shafts for transmitting driving force therebetween comprising, a driving shaft having a hub secured thereon, an aligned driven shaft axially spaced from said driving shaft and having a hub secured thereon, the end of one of said shafts extending into and journaled in the hub of said other shaft, said hubs having opposed faces, a friction disk engaged between said opposed faces, radially extending flanges on said hubs in axially spaced relation to each other, at least one of said flanges spaced axially from its hub face, clamping bolts extending through said spaced flanges, and resilient doughnut-like cushions surrounding the ends of said bolts and having anchoring necks extending through said flanges to permit canting of said bolts in response to torsional movement between said hubs.

References Cited by the Examiner

UNITED STATES PATENTS

| 1,200,143 | 10/16 | Schrade | 64—11.16 |
| 1,335,740 | 4/20 | Kehoe | 64—15 |
| 1,512,446 | 10/24 | Barnes | 64—30 |
| 2,326,451 | 8/43 | Fawick | 64—11.10 |

FOREIGN PATENTS

| 2,487 | 1/84 | Great Britain. |

ROBERT C. RIORDON, *Primary Examiner.*